Dec. 14, 1954   J. P. JAKOB ET AL   2,696,932
MACHINE FOR CONVEYING KEY BLANKS AND THE LIKE
Filed Dec. 24, 1948   3 Sheets-Sheet 1
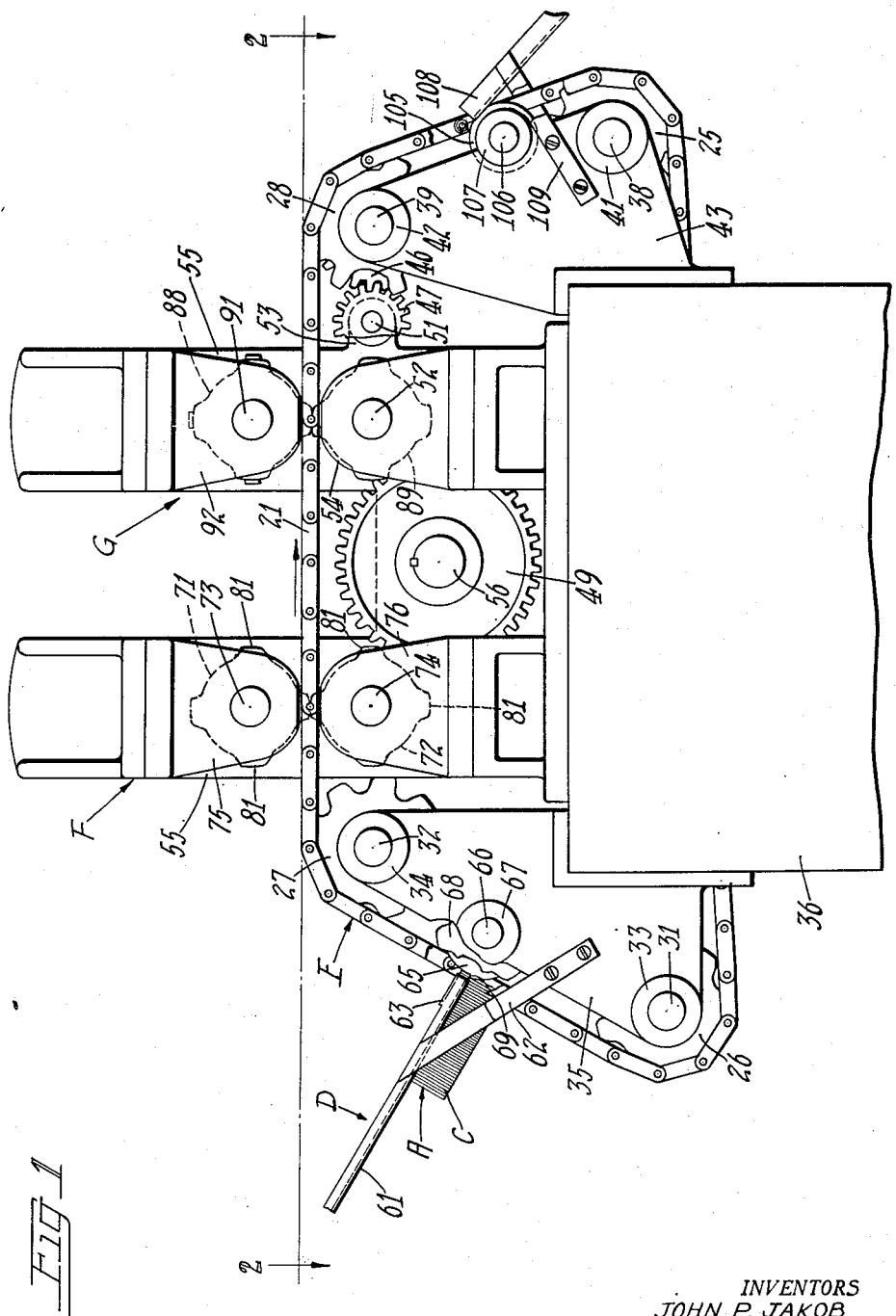
INVENTORS
JOHN P. JAKOB
AUGUST E. ALMGREN
BY
ATTORNEYS Dec. 14, 1954  J. P. JAKOB ET AL  2,696,932
MACHINE FOR CONVEYING KEY BLANKS AND THE LIKE
Filed Dec. 24, 1948  3 Sheets-Sheet 2
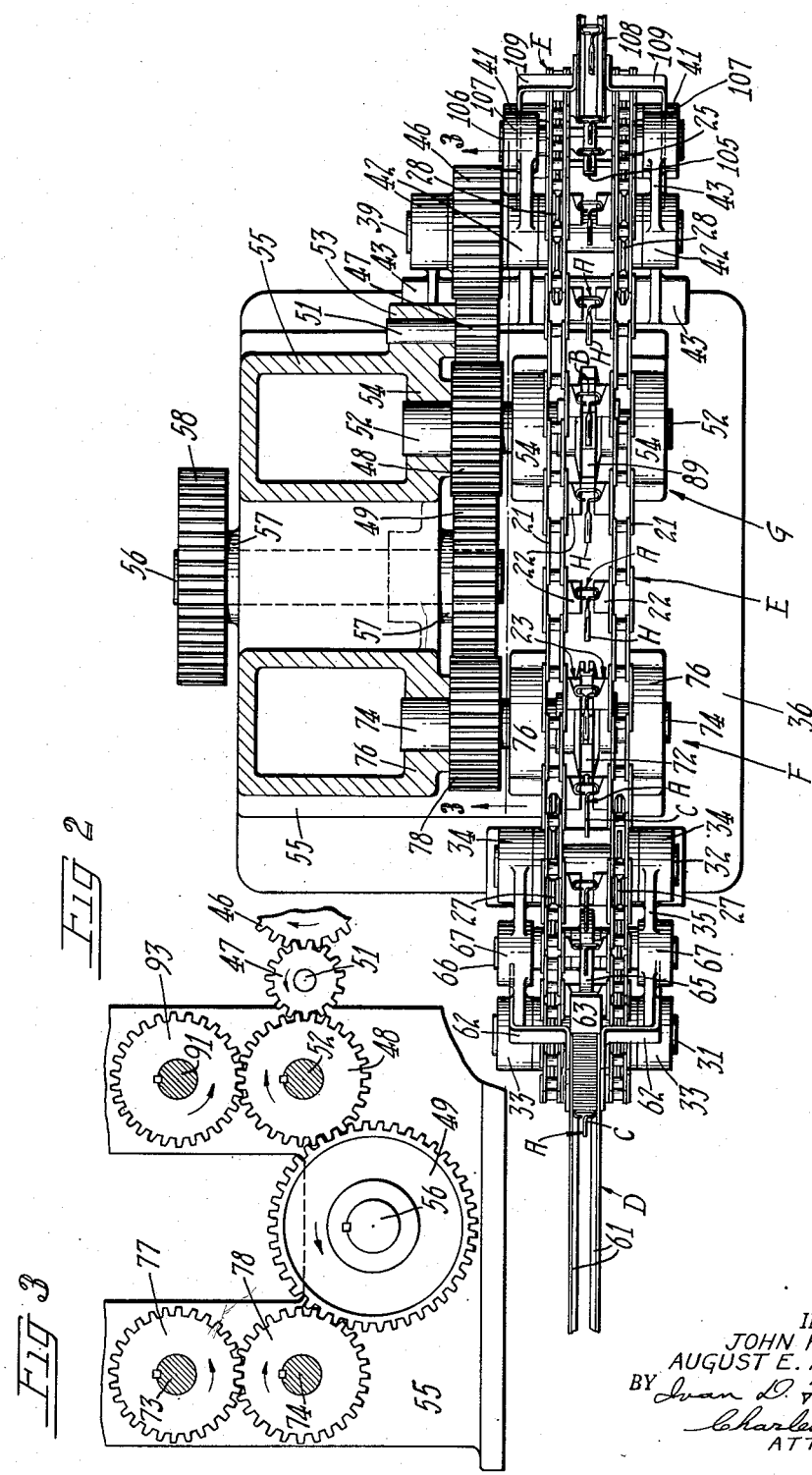
INVENTORS
JOHN P. JAKOB
AUGUST E. ALMGREN
BY Ivan D. Thornburgh
Charles H. Erne
ATTORNEYS Dec. 14, 1954   J. P. JAKOB ET AL   2,696,932
MACHINE FOR CONVEYING KEY BLANKS AND THE LIKE
Filed Dec. 24, 1948   3 Sheets-Sheet 3
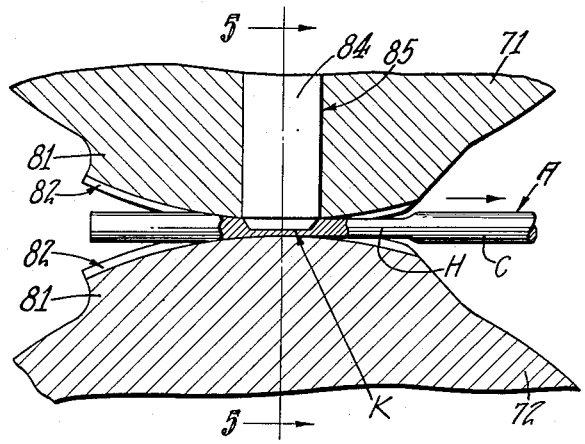
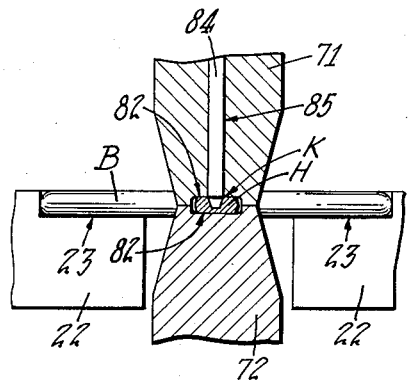
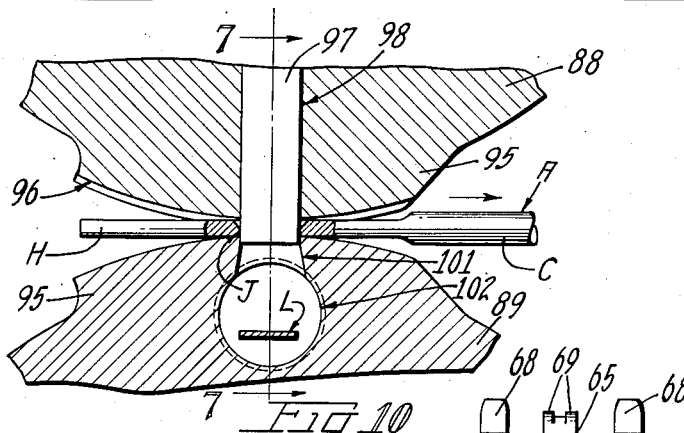
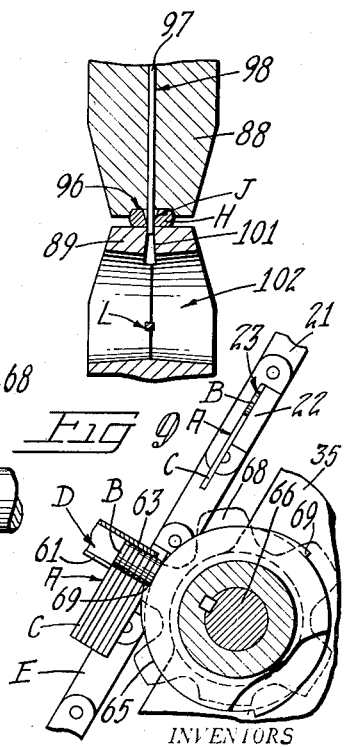
INVENTORS
JOHN P. JAKOB
AUGUST E. ALMGREN
BY Ivan D. Thornburgh
Charles H. Erne
ATTORNEYS

United States Patent Office 2,696,932
Patented Dec. 14, 1954

2,696,932

MACHINE FOR CONVEYING KEY BLANKS AND THE LIKE

John P. Jakob, Roselle, and August E. Almgren, Hillside, N. J., assignors to American Can Company, New York, N. Y., a corporation of New Jersey Application December 24, 1948, Serial No. 67,208

4 Claims. (Cl. 221—236)

This invention relates to a machine for operating upon container opening keys which are used in connection with tearing strip containers and the like articles and has particular reference to improved devices for feeding key blanks or other articles in timed order and for flattening and slotting the shank portions of the blanks.

An object of the invention is the provision of a machine for reforming the shanks of key blanks wherein the key blanks are fed continuously at high speed while successive operations are accurately performed thereon for flattening and slotting the shank of the key.

Another object is the provision of a machine of the character described wherein key blanks are fed continuously through different work performing stations in such a manner as to present the shank end of the moving key blank for shank flattening and slot piercing operations.

Another object is the provision in such a machine of a conveyor having magnetic holding devices wherein a portion of the key blank is firmly gripped for moving the key blank along a predetermined path of travel while a remaining portion of the key blank extends out into space where it is free and unconfined for the performance of flattening and slot piercing or other operations thereon.

Numerous other objects and advantages of the invention will be apparent as it is better understood from the following description, which, taken in connection with the accompanying drawings, discloses a preferred embodiment thereof.

Referring to the drawings:

Figure 1 is a front elevational view of a key forming machine embodying the present invention, with parts broken away;

Fig. 2 is a top plan sectional view of the machine taken substantially along the line 2—2 in Fig. 1, with parts broken away and parts in section;

Fig. 3 is a longitudinal sectional view taken substantially along the line 3—3 in Fig. 2;

Fig. 4 is an enlarged fragmentary sectional view of rotary key flattening and recess forming rollers used in the machine, with a key shank disposed between the rollers;

Fig. 5 is a sectional detail taken substantially along the line 5—5 in Fig. 4;

Fig. 6 is a view similar to Fig. 4 showing rotary slot piercing rollers used in the machine, with a key shank disposed between these rollers;

Fig. 7 is a sectional detail taken substantially along the line 7—7 in Fig. 6;

Fig. 8 is a fragmentary top plan view of an endless chain conveyor shown in Fig. 2 drawn to an enlarged scale and illustrating container opening keys in place on the conveyor for advancement therewith;

Fig. 9 is an enlarged fragmentary detail of a key blank supply magazine and a supporting and separating device shown in Figs. 1 and 2, parts broken away and parts in section; and Fig. 10 is an end view of the supporting and separating device shown in Fig. 9, parts broken away, and parts in section.

As a preferred and exemplary embodiment of the present invention the drawings illustrate a machine for flattening and slotting the shanks of container opening keys made from round wire key blanks A (Figs. 2 and 8), which blanks are formed at one end with a head or loop B and at the opposite end with a straight round shank C.

In the machine the key blanks A are fed individually from the bottom of a stack of such blanks located in a magazine D (Figs. 1 and 2) and are received on a continuously moving conveyor E which carries them successively through a rotary shank flattening mechanism F and a rotary piercing or slotting mechanism G located adjacent the path of travel of the conveyor.

During passage of a key blank A through the mechanism F, a portion of the round shank C of the blank is flattened into a flat shank section H (Figs. 2 and 8). During this flattening operation the shank section is also partially pierced or a countersink or depression formed therein. The piercing of the blank section H is completed as the blank passes through the mechanism G and this forms a slot J in the section. This completes the operations on the blank and it is thereafter discharged from the conveyor to any suitable place of deposit.

The conveyor E comprises a pair of spaced and parallel endless chains 21 (Figs. 1, 2 and 8) which at spaced intervals along their length carry inwardly projecting pairs of blank carrier lugs or supports 22 for receiving the key blanks A from the magazine D and for carrying them through the machine. There are two carrier lugs 22 for each key blank and they are secured one on each chain in transversely spaced apart relation and are located in horizontally and longitudinally aligned relation.

The outer face of each carrier lug 22 adjacent its leading edge is formed with a shallow pocket or recess 23 (see Fig. 8) which is of such dimensions in depth and breadth as to snugly receive and properly locate the head or loop B of one key blank A and to hold the blank in a longitudinal position parallel with the conveyor chains 21 with the shank of the blank trailing and extending out into the working space between the chains. These carrier lugs 22 preferably are permanently magnetized to attract and hold the received blanks in the position above described.

The conveyor chains 21 are arranged to carry a received key blank A upwardly along an inclined path of travel at the entrance end of the machine and thence along a straight horizontal path of travel extending through the flattening and slotting mechanism F and G and then along a declining path of travel at the discharge end of the machine. For this purpose the chains operate over three pairs of spaced idler sprockets 25, 26, 27 and a pair of spaced driving sprockets 28 arranged as best shown in Figs. 1 and 2.

The idler sprockets 26, 27 are located at the entrance end of the machine and are mounted respectively on transverse idler shafts 31, 32 journaled in respective bearings 33, 34 formed in a bracket 35 bolted to a frame 36 which constitutes the main frame of the machine. In a similar manner, the idler sprockets 25 and the driving sprockets 28 are located at the discharge end of the machine and are mounted respectively on a transverse idler shaft 38 and a driving shaft 39 journaled in respective bearings 41, 42 formed in a bracket 43 bolted to the main frame 36.

The conveyor chains 21 are operated continuously by a train of gears which include a spur gear 46 (Figs. 1, 2 and 3) mounted on one end of the driving shaft 39. This gear meshes with and is driven by an intermediate gear 47 which is driven by a gear 48 which in turn is rotated by a master gear 49. The gears 47, 48 are mounted on shafts 51, 52 journaled in respective bearings 53, 54 formed in a housing 55 which supports the shank flattening and slotting mechanisms F, G. This master gear 49 is carried on a main drive shaft 56 which is journaled in bearings 57 formed in the housing 55. This drive shaft is rotated continuously by any suitable means through a main driving gear 58 carried on the shaft as shown in Fig. 2.

The magazine D from which the key blanks A are fed to the conveyor E is disposed adjacent the inclined portion of the conveyor at the entrance end of the machine as best shown in Figs. 1, 2 and 9. This magazine comprises a pair of spaced and parallel L shaped guide rails 61 which extend outwardly at right angles to the path of travel of the conveyor and which are supported on a pair of straps 62 secured to the frame bracket 35. The key blanks A hang from these guide rails, the rails engaging under the heads or loops B of the blanks, thus confining the blanks in an inclined stacked formation. The shanks C of the blanks depend through the space between the guide rails.

Thus as a key blank A is removed from the bottom of the stack the entire stack slides down along the inclined rails to position a succeeding blank in the place of the one removed. Adjacent the lower end of the magazine a cut-off plate 63 (Figs. 2 and 9) is secured across the top of the rails 62 to insure removal of only one blank at a time.

The lowermost key blank A in the stack rests against and is fed from the magazine D by a rotatable wheel or separator disc 65 (Figs. 1, 9 and 10) which extends into the space between the chains 21 of the conveyor E and which is located adjacent the conveyor on the side opposite the magazine so that the conveyor is between the disc mounting and the magazine. The disc 65 is narrow enough to pass between the carrier lugs 22 without interference and is mounted on a short shaft 66 journaled in bearings 67 formed in the bracket 35. This disc is rotated continuously in time with the conveyor E by a pair of driving sprockets 68 which are mounted on the shaft adjacent the disc and which mesh with the chains 21 of the conveyor. The periphery of the disc adjacent the magazine is tangent to the plane in which the bottoms of the pockets 23 of the carrier lugs 22 travel as they move past the magazine and is formed with a plurality of spaced pairs of feed dogs 69.

Each pair of dogs 69 is spaced apart transversely of the disc edge a distance sufficient to permit the dogs to straddle the shank C of the key blanks and engage the blank under its head or loop B. There are three pairs of feed dogs 69 arranged for co-operation with the carrier lugs 22 on the conveyor chains 21 and they are maintained in timed relation with the carrier lugs during the travel of the conveyor and the rotation of the separator disc.

Hence as a pair of the magnetic carrier lugs 22 traveling with the conveyor chains 21 move past the magazine D as shown in Fig. 9, a pair of the feed dogs 69 on the separator disc 65 engage under the head B of the lowermost key blank A in the magazine and starts the blank moving from under the stack in the direction of travel of the conveyor. The cut-off plate 63 permits this withdrawal of the lowermost blank but holds back the key blank next above. Simultaneously with this initial moving action of the key blank, the pockets 23 of the carrier lugs 22 move into position around the head of the moving blank and properly locate the blank on the lugs so that the shank C trails behind the head in the space between the lugs. The magnetic properties of the lugs hold the blank firmly in place as the conveyor and the separator disc continue to slide the blank out of the magazine. As soon as the blank is free of the magazine, the dogs 69 rotate away from the key blank and leave the blank fully seated in and under control of the carrier lugs for movement with the conveyor.

Upon receiving a key blank A, the conveyor E carries the blank upwardly along its inclined path of travel and around the sprockets 27 into the upper run or straight line path of travel which extends through the shank flattening and slotting mechanisms F, G hereinbefore mentioned. A key blank thus traveling with the conveyor first passes through the flattening mechanism F in which a portion of the shank is flattened and an incomplete slot piercing or countersinking operation is performed on the flattened section. These operations are effected by a pair of continuously rotating flattening and partial piercing elements or rollers 71, 72 (Figs. 1, 4 and 5) disposed one above and one below the conveyor E and between which the key blank is passed.

The rollers 71, 72 are mounted on short shafts 73, 74 journaled in bearings 75, 76 formed in the housing 55. The rollers are rotated in unison by a pair of meshing gears 77, 78 (see Fig. 3) mounted on the inner ends of the respective shafts 73, 74. The lower gear 78 meshes with the master gear 49 and through this connection the rollers 71, 72 are rotated in time with the lineal travel of the conveyor E.

The rollers 71, 72 in width are slightly narrower than the space between the carrier lugs 22 and are tapered as best shown in Fig. 5 to permit movement of the lugs past the rollers without interference. Diametrically, the rollers are spaced apart a distance slightly in excess of the thickness of the key blank to provide clearance space for the head B and that portion of the shank C which are not to be flattened.

At spaced intervals around their peripheries, the rollers 71, 72 are formed with co-operating, flattening segments or die elements 81 which project outwardly beyond the peripheries of the rollers and which are adapted to come into tangential relation as the rollers rotate. These die elements are formed with longitudinal flattening grooves or recesses 82 which are of a width equal to or slightly greater than the desired width of the flattened shank section H to be formed and which are of a depth equal to one half the thickness of the flattened shank section H. Taken together, as during the flattening operation, the combined depths of the co-operating grooves are equal to the desired thickness of the flattened section H.

In addition to these flattening grooves 82, each flattening element 81 of the upper roller 71, is provided with an initial or first operation slot piercing or countersink member or punch 84 (Figs. 4 and 5). These punches preferably have two broad faces and two narrow faces as shown in Figs. 4 and 5 and are fixed in the roller 71 in radial recesses 85 formed in the roller. The outer end of each punch 84 extends through the flattening groove 82 and projects slightly beyond the outer periphery of the die element 81. This outer end preferably is tapered on all sides to facilitate penetration into the material of the key blank.

Hence as a pair of the carrier lugs 22 traveling with the conveyor E, approaches the flattening mechanism F, the key blank A held by the carrier lugs is carried between the rotating flattening rollers 71, 72 for the shank flattening operation. The head B of the blank A is first advanced between the rollers without alteration. As the blank continues to advance, with its shank C trailing, a pair of the die elements 81 of the rollers 71, 72 rotate into position against the portion of the blank to be flattened and engage the shank in the flattening grooves 82. Thus the die elements 81 roll along the portion of the shank to be flattened and compress the shank into the desired shape and thickness as shown in Figs. 4 and 5 to produce the flattened section H hereinbefore mentioned.

During this flattening operation and as the die elements 81 of the two rollers 71, 72 are rolling against each other, the piercing punch 84 penetrates the flattened section H to about one half its thickness and thus forms a longitudinal recess or depression K (Figs. 4 and 5) in the flattened section H. This recess K constitutes a started or partial slot which is completed at the next station where the slotting mechanism G is located. The entire remaining portion of the shank C may be flattened as the blank advances between the rotating rollers 71, 72 or the flattening operation may be terminated if desired at any point before reaching the end of the shank. The length of the shank to be flattened depends upon the lineal periphery of the die elements 81.

This passage of the key blank A through the flattening mechanism F is continuous, the flattening operation being performed while the blank advances. Upon leaving the flattening mechanism F the key blank A advances toward the slotting mechanism G for the completion of the slot in the flattened section H.

The slotting mechanism G like the flattening mechanism F includes a pair of continuously rotating slotting rollers 88, 89 (Figs. 1, 6 and 7) disposed one above and one below the conveyor E and between which the key blank is passed. The upper roller 88 is mounted on a short shaft 91 journaled in a bearing 92 formed in the housing 55. The lower roller 89 is carried on the shaft 52 journaled in the housing 55. The rollers are continuously rotated in time with each other and in time with the conveyor E by a gear 93 (Fig. 3) which is mounted on the roller shaft 91 and which meshes with the gear 48 on the shaft 52.

The slotting rollers 88, 89 like the flattening rollers 71, 72 are narrow and tapered at their outer peripheries to permit passage of the carrier lugs 22 on either side of them without interference. The peripheries of the rollers 88, 89 are also spaced apart a distance slightly greater than the thickness of the heads B of the key blanks A to provide clearance space for the unflattened portions of the blank.

At spaced intervals around their peripheries the slotting rollers 88, 89 are formed with co-operating, shank guide elements or segments 95 which project outwardly beyond the peripheries of the rollers as best shown in Figs. 6 and 7. The guide elements in the upper roller 88 are formed with longitudinal guide grooves 96 of a depth of about one half the thickness of the flattened section H of the key blank and of a width substantially the same as that of the width of this flattened section H for confining and guiding this section of the blank as it passes between the rollers.

In addition to this guide groove 96, each slotting segment 95 of the upper roller 88 is provided with a broad flat second operation slot piercing member or punch 97 (Figs. 6 and 7). These punches are slightly smaler in breadth and thickness than the first operation punches 84, but like these latter punches, the punches 97 are fixed in the roller 88 in radial recesses 98 formed in the roller.

The outer end of each punch 97 extends outwardly through the guide groove 96 and projects beyond the outer periphery of the guide segment 95 for a distance slightly greater than the thickness of the flattened section H of the key blank A. The outer edges of these punches 97 are sharp to facilitate cutting through the shank section H of the blank.

Die openings 101 formed in the guide segments 95 of the lower roller 89 co-operate with the punches 97 in the upper roller 88 to facilitate cutting of the slot J in the shank section H of the blank. The lower ends of these openings communicate with outwardly tapered holes or discharge openings 102 formed in the lower roller and extending through the roller transversely thereof for the purpose of discharging the scrap portion cut out of the flattened shank section H.

Hence as the conveyor E carries the key blank A between the slotting rollers 88, 89 the head B and the unflattened portion of the shank C pass through without alteration. As the flattened section H of the shank advances into position between the rollers, a pair of the guide segments 95 rotate into position against the blank, the lower guide segment backing up the shank section H while the upper guide segment surrounds and confines this shank section to properly locate it and to hold it against lateral displacement as shown in Figs. 6 and 7.

With the rotating guide segments 95 in control of the flattened shank section H, the punch 97 and the die opening 101 rotate into position adjacent the preformed or started slot depression K in the shank section. During this portion of the cycle of rotation of the rollers, the punch 97 enters the depression K and cuts through the flattened shank section H, thus removing a scrap portion L which produces the slot J hereinbefore mentioned.

The scrap portion L falls through the die opening 101 into the opening 102 and is thrown clear of the roller. During continued rotation of the rollers 88, 89 and advancement of the conveyor E, the punch 97 is withdrawn from the key blank and the guide segments 95 rotate away from the blank to free the blank for discharge from the machine. Completion of this slot forming operation completes the operations on the key blank.

Since the punch 97 is smaller in breadth and width than the first operation punch 84 the slot thus formed in the key blank is provided with tapered sides as best shown in Figs. 6 and 7, for a depth of approximately one half the thickness of the flattened shank section H. These tapered sides facilitate entrance into the slot of the container opening tongue or other element of the container with which the opening key is to be used.

After passing through the slotting mechanism G, the conveyor E carries the slotted key blank downwardly along the declining section of the path of travel of the conveyor for discharge of the blank from the machine. Discharge of the blank is effected by an idle discharge roller 105 (Figs. 1 and 2) which is freely mounted on an idler shaft 106 carried in bearings 107 formed in the frame bracket 43. The roller 105 is located between the conveyor chains 21 and is narrow enuogh so that it extends up between the passing carrier lugs 22 with its outer periphery projecting outwardly beyond the conveyor.

Hence when a pair of the carrier lugs 22 advance a key blank A past the discharge roller 105 the blank rides up onto the roller, head end first, and thus the roller lifts the head B of the blank out of the pockets 23 of the carrier lugs against their magnetic attraction for the blank and hence strips the blank free of the conveyor. The freed key blank falls into an inclined chute 108, the upper end of which surrounds the discharge roller 105, and thus the blank is directed to any suitable place of deposit. The chute is supported on a pair of straps 109 which are secured to the frame bracket 43.

In such a construction of machine the individual key blanks may be advanced in spaced and timed order in a procession moving continuously through the continuously operating shank flattening and slotting mechanisms thus producing predetermined accurate operations upon the individual key blanks while they travel at high speed through the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a mechanism for feeding and conveying magnetizable key blanks along a path of travel for a finishing operation, each blank having a finished head portion and an unfinished shank portion, the improvement comprising a continuously movable conveyor for carrying said key blanks, said conveyor including two parallel conveyor elements having a working space therebetween affording working access to the blanks for a finishing operation thereon, a plurality of pairs of transversely aligned magnetic blank holding members mounted at spaced intervals on said conveyor elements and projecting into said working space, each of said aligned blank holding members having a shallow pocket therein for cooperatively holding a said key head with the key shank extending freely into said working space, means operable within said working space for feeding key blanks to said pairs of blank holding members, and means for moving said conveyor.

2. A mechanism as defined in claim 1, wherein said key feeding means comprises a magazine disposed adjacent the path of said conveyor for holding a stack of said blanks, and a separator disc mounted in stack supporting position beneath said magazine and rotatable in said working space in synchronism with said conveyor.

3. A mechanism as defined in claim 2, wherein the separator disc has spaced peripheral feed dogs movable through said working space for successively engaging the finished head portion of the nearest key blank in said stack for separating said blank from the stack and transferring it to a said pair of key blank holding members with the shank portion of said key blank projecting into said working space.

4. A mechanism as defined in claim 1, having a rotatable stripping member disposed in the path of travel of the conveyor and operable between the transversely spaced blank holding members of each of said pairs for successively engaging and stripping the completed container opening keys from the pockets of said members for discharge from the machine.

References Cited in the file of this patent

UNITED STATES PATENTS

| Number | Name | Date |
|---|---|---|
| 291,659 | Adt | Jan. 8, 1884 |
| 402,087 | Kindl | Apr. 23, 1889 |
| 405,996 | Griscom | June 25, 1889 |
| 805,736 | Lindgren | Nov. 28, 1905 |
| 1,669,833 | McColl | May 15, 1928 |
| 1,810,724 | Parker | June 16, 1931 |
| 1,892,590 | Steele | Dec. 27, 1932 |
| 1,918,534 | Gosch | July 18, 1933 |
| 1,920,108 | Rossmann | July 25, 1933 |
| 1,936,611 | Young | Nov. 28, 1933 |
| 2,022,864 | MacDonald | Dec. 3, 1935 |
| 2,231,196 | Romyns | Feb. 11, 1941 |
| 2,347,391 | Benning | Apr. 25, 1944 |
| 2,348,400 | Manspeaker | May 9, 1944 |
| 2,368,483 | Monroe | Jan. 30, 1945 |
| 2,652,579 | Hartzell | Sept. 22, 1953 |